United States Patent [19]
Gaus et al.

[11] 4,233,861
[45] Nov. 18, 1980

[54] CHANGE-SPEED TRANSMISSION

[75] Inventors: Hermann Gaus, Stuttgart; Jürgen Pickard, Wernau, both of Fed. Rep. of Germany

[73] Assignee: Daimler-Benz Aktiengesellschaft, Fed. Rep. of Germany

[21] Appl. No.: 23,762

[22] Filed: Mar. 26, 1979

[30] Foreign Application Priority Data

Mar. 25, 1978 [DE] Fed. Rep. of Germany ....... 2813223

[51] Int. Cl.$^3$ ............................................. F16H 57/10
[52] U.S. Cl. ................................................... 74/763
[58] Field of Search ...................... 74/763, 753, 750 R, 74/762

[56] References Cited

U.S. PATENT DOCUMENTS

| | | | |
|---|---|---|---|
| 3,733,928 | 5/1973 | Uozumi et al. | 74/763 X |
| 3,859,871 | 1/1975 | Uozumi et al. | 74/763 X |
| 4,015,486 | 4/1977 | Zach, Jr. | 74/753 |
| 4,038,887 | 8/1977 | Murakami et al. | 74/763 X |

*Primary Examiner*—Peter P. Nerbun
*Attorney, Agent, or Firm*—Craig and Antonelli

[57] ABSTRACT

A change-speed transmission which includes an input shaft and an output shaft which are drivingly connected by a forward and rearward planetary gear system. The forward planetary gear system includes two planetary gears one of which meshes merely with a sun gear with the other planetary gear meshing with a further sun gear as well as with a ring gear. The planetary gears are carried by a double carrier which is drivingly connected with one transmission member of the rearward planetary gear system with the ring gear being drivingly connected with another member of the rearward planetary gear system by way of respective torque transmitting coupling trains. A change-speed clutch for producing a direct transmission of the rearward planetary gear system is operatively connected with the double carrier which is also drivable through a gear shifting clutch by way of the input shaft. The sun gear of the planetary gear system which does not mesh with the ring gear is positionally arranged between the other sun gear of the forward planetary gear system and the output shaft with the sun gear being drivable through a further gear shifting clutch by way of the input shaft.

11 Claims, 3 Drawing Figures

|  | K1 | K2 | K3 | K4 | B1 | B2 | B3 | F |
|---|---|---|---|---|---|---|---|---|
| 1ST GEAR |  |  | X |  |  | X |  | X |
| 2ND GEAR |  |  | X |  | X | X |  |  |
| 3RD GEAR | X |  | X |  |  | X |  |  |
| 4TH GEAR |  | X | X | X |  |  |  |  |
| 5TH GEAR |  | X |  | X | X |  |  |  |
| REVERSE GEAR | X | X |  |  |  |  | X |  |

CHANGE-SPEED TRANSMISSION

The present invention relates to a transmission arrangement and, more particularly, to a change-speed transmission for vehicles wherein an input shaft, drivable by a prime mover, is connectable with an output shaft, adapted to be coupled to vehicle wheels, with a transmission element in driving connection with the output shaft and associated to a rearward single web planetary gear system, and in which two planetary gears of a double web forward planetary gear system are in mutual meshing engagement, with one of the planetary gears being in mesh only with a sun gear and the other planetary gear being in mesh with a further sun gear as well as with a ring gear, with one sun gear being driven by the input shaft and the further sun gear being adapted to be fixedly braked, and wherein the double web is adapted to be drivingly connected with one member and the ring gear with another member of two remaining members of the rearward planetary gear system, respectively, by one torque transmitting coupling train in which a change-speed clutch is arranged to produce a direct transmission of the rearward planetary gear system.

A change-speed transmission of the aforementioned type has been proposed within the assignee corporation so as to provide for a low expenditure in structural components since, in order to obtain four forward speeds, the only elements required in total in the transmission are merely two coupling trains and, for each planetary gear transmission, respectively, one change-speed clutch and change-speed brake and, for the reverse gear, one further change-speed brake.

The aim underlying the present invention essentially resides in providing a change-speed transmission of the aforementioned type in which an additional high speed gear or overdrive is provided.

In accordance with advantageous features of the present invention, the double web or carrier of a forward planetary gear system is connected to the coupling train provided with the change-speed clutch and is also drivable by way of a further clutch for gear shifting by the input shaft with the sun gear of the planetary gear not meshing with the ring gear being positionally arranged between the other sun gear of the forward planetary gear system and the output shaft and furthermore being drivable by way of an additional clutch for gear shifting by the input shaft.

In change-speed transmissions of the aforementioned type, the change-speed clutch is operatively connected directly between the two gear members of the forward planetary system so as to produce a direct transmission of the forward planetary gear system. In contradistinction thereto, in the change-speed transmission in accordance with the present invention, to produce a direct transmission of the forward planetary gear system, the change-speed clutch is operatively inserted or arranged between the input shaft and the sun gear, the planetary gear of which meshes with the ring gear.

The direct transmission of the forward planetary gear system is obtained by the present invention by mutually fixing the two sun gears non-rotatably by way of the input shaft by means of the change-speed clutch for the direct transmission and by means of one of the clutches for the gear change. This results in the advantage that the reverse gear can be produced in exactly the same way, with the corresponding transmission members, as in the aforementioned proposed change-speed transmission of the assignee corporation.

Moreover, in the transmission of the present invention, the double web of the forward planetary gear system is fixedly braked and the sun gear of the planetary gear meshing with the ring gear is driven, by way of the change-speed clutch for the direct transmission of the forward planetary gear system, by means of the input shaft whereby the ring gear of the forward planetary gear system drives the rearward planetary gear system in the reverse direction of rotation.

A further development of the change-speed transmission in accordance with the present invention is characterized in that the input shaft is connected to a pump impeller of a hydrodynamic torque converter and in that the change-speed clutch for the direct transmission of the forward planetary gear system as well as the clutch for the gear shifting of the sun gear, the planetary gear of which does not mesh with the ring gear, are operatively connected between the turbine impeller of the hydrodynamic torque converter and the associated sun gear.

By virtue of the last-mentioned features of the present invention, a change-speed transmission is obtained in which the hydrodynamic torque converter, usually connected into the power transmission between the prime mover and the change-speed transmission, is positively bridged in the high speed gear or overdrive so that there are no hydraulic transmission losses.

One advantage of the change-speed transmission of the present invention resides in the fact that an additional gear or speed has been obtained without increasing the number of transmission elements and clutches.

A further advantageous feature of the change-speed transmission of the present invention resides in the fact that the transmission structure of the two planetary gear systems corresponds to that of the aforementioned change-speed transmission proposed by the assignee corporation.

An additional advantage of the change-speed transmission of the present invention resides in the fact that, with the use of two additional clutches for the gear change, the remaining speed-change clutches and brakes can be provided in the same structural arrangement in the transmission housing as in the case of the aforementioned change-speed transmission proposed by the assignee corporation.

Yet another advantage inherent in the change-speed transmission of the present invention resides in the fact that, for the high speed or overdrive gear, a transmission ratio of about 0.7 can be attained between the input shaft speed and the output shaft speed so that an especially economical fuel consumption for the vehicle is readily obtained.

It is also advantageous in accordance with the change-speed transmission of the present invention that, for controlling the four forward speeds and the reverse gear, the change-speed clutches and brakes operate in the same manner as in the aforementioned change-speed transmission proposed by the assignee corporation so that a control plate of such transmission can be substantially incorporated into the transmission of the present invention.

A still further advantage of the change-speed transmission of the present invention resides in the fact that the four forward gears in accordance with the aforementioned change-speed transmission proposed by the assignee corporation is retained as the basic transmission. The two additional clutches for the gear change can be disposed in an intermediate housing for longitudinal compensation at an end face of the basic transmission on an output shaft side so that only the transmission case cap of the basic transmission needs to be modified.

In the change-speed transmission of the present invention, it is furthermore advantageous that the sun gear of the forward planetary gear system, which sun gear is larger in diameter, is disposed in front of the smaller other sun gear so as to offer the possibility of extending therethrough a drive quill shaft for the double web or carrier without having to enlarge an outer diameter thereof and thus also the diameter of the ring gear.

Accordingly, it is an object of the present invention to provide a change-speed transmission which avoids, by simple means, any shortcomings and disadvantages encountered in the prior art.

A further object of the present invention resides in providing a change-speed transmission by which an additional high speed or overdrive gear is obtained without substantially increasing the number of transmission elements and clutches.

A further object of the present invention resides in providing a change-speed transmission by which especially economical fuel consumption for a vehicle can be realized.

Yet another object of the present invention resides in providing a change-speed transmission which is simple in construction and therefore relatively inexpensive to manufacture.

Another object of the present invention resides in providing a change-speed transmission in which hydraulic transmission losses are minimized if not avoided in high speed or overdrive operation.

These and other objects, features, and advantages of the present invention will become more apparent from the following description when taken in connection with the accompanying drawings which show, for the purposes of illustration only, two embodiments in accordance with the present invention, and wherein.

Figures 1, 3:
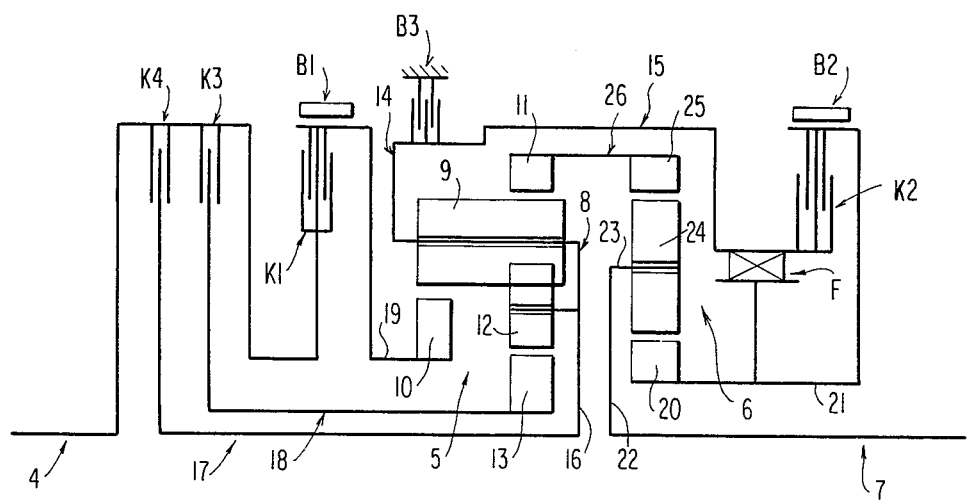
FIG. 1 is a schematic view of a change-speed transmission in accordance with the present invention.
FIG. 3 is a gear-shifting diagram for a control of the change-speed transmissions illustrated in FIGS. 1 and 2.
Figure 2:
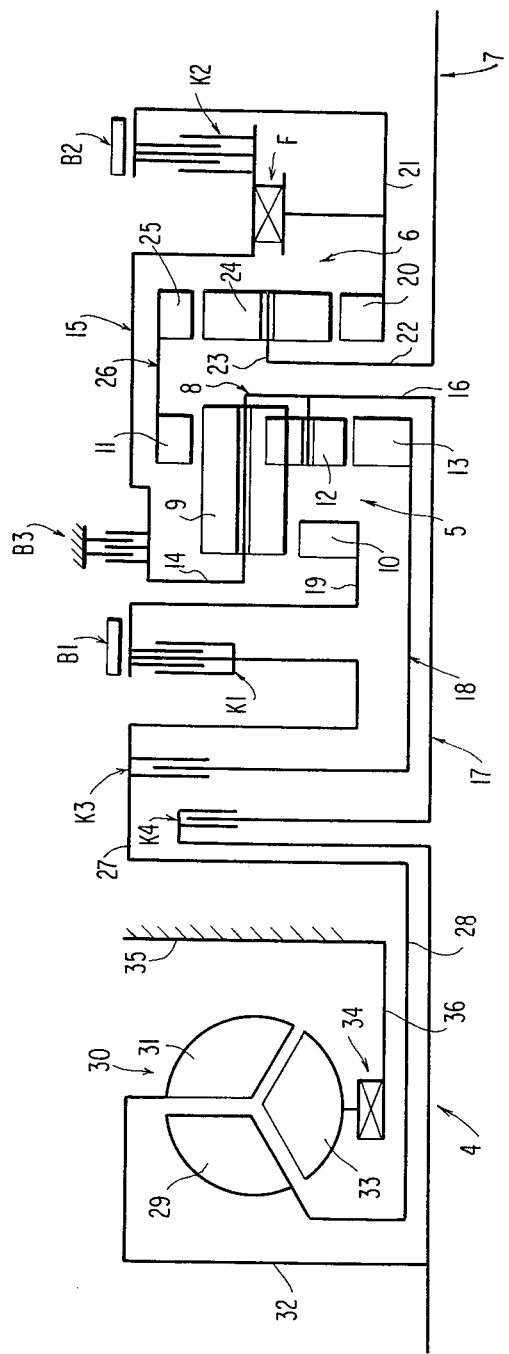
FIG. 2 is a schematic view of a change-speed transmission in accordance with a second embodiment of the present invention.

Referring now to the drawings wherein like reference numerals are used throughout the various views to designate like parts and, more particularly, to FIGS. 1 and 2, according to these figures, a transmission includes an input shaft generally designated by the reference numeral 4, driven by a prime mover such as, for example, an internal combustion engine, with the input shaft 4 being adapted to be placed in driving connection with an output shaft generally designated by the reference numeral 7 by a forward planetary gear system generally designated by the reference numeral 5 and a rearward planetary gear system generally designated by the reference numeral 6. The output shaft 7, in turn, is adapted to be coupled in a conventional manner with vehicle wheels (not shown).

The forward planetary gear system 5 includes a double web or carrier generally designated by the reference numeral 8 for supporting pairs of planetary gears 9, 12. The planetary gear 9, at a forward end, is adapted to mesh with a large sun gear 10 and, at a rearward end, with a ring gear 11. The planetary gear 12 is adapted to mesh with the planetary gear 9 as well as with a rearward small sun gear 13. The double carrier 8 has a driving connection 14 with an outer driving drum generally designated by the reference numeral 15 which extends over the ring gear 11 and a driving connection 16 with an intermediate shaft 17 disposed between the input shaft 4 and the output shaft 7. The intermediate shaft 17 is adapted to be coupled by way of a clutch generally designated by the reference character K4 with the input shaft 4. A further clutch generally designated by the reference character K3, provided for gear changes, is operatively connected to a quill shaft generally designated by the reference numeral 18 which is fixed for rotation with the small sun gear 13.

The quill shaft 18 extends through a quill shaft 19 fixedly mounted for rotation with the large sun gear 10. The quill shaft 19 cooperates with a change-speed clutch generally designated by the reference character K1 for the direct gear shifting of the planetary gear system 5, as well as with a change-speed brake generally designated by the reference character B1 to produce a second gear or second speed range of the transmission.

The double carrier 8 may be arrested or braked with the aid of the outer driving drum 15 by way of a change-speed brake generally designated by the reference character B3 so as to produce the reverse gear or reverse speed of the transmission and may also be coupled, by way of a change-speed clutch generally designated by the reference character K2, with a quill shaft 21 fixedly mounted for rotation with a sun gear 20 of the rearward planetary gear system 6. The sun gear 20 may be arrested or braked by way of a further change-speed brake generally designated by the reference character B2 and may also be coupled, by way of a freewheel clutch generally designated by the reference character F, cooperating with the outer driving drum 15 and the quill shaft 21, with the double carrier 8, when the carrier 8 overtakes the sun gear 20 in a driving direction of rotation of the input shaft 4.

The output shaft 7 includes a driving connection 22 with a carrier 23 for bearing the planetary gears 24 of the rearward planetary gear system 6. The planetary gears 24 are adapted to mesh with a ring gear 25 connected for rotation with the ring gear 11 by way of an inner driving drum generally designated by the reference numeral 26.

The differences between the transmissions of FIGS. 1 and 2 essentially reside in the fact that the change-speed clutch K1 as well as one of the clutches K3 for the gear shifting operation are associated, in the transmission of FIG. 1, directly with the input shaft 4; whereas, in the transmission of FIG. 2, the change-speed clutch K1 and clutch K3 cooperate with a driving drum 27 which is connected by a quill shaft 28 drivingly connected with a turbine impeller 29 of a hydrodynamic torque converter generally designated by the reference numeral 30. While a pump impeller 31 of the torque converter 30 is connected by a driving disk 32 to the input shaft 4 for rotation therewith, a stator 33 of the torque converter 30 rests by way of a freewheel clutch 34 in the converter zone on a quill shaft 36 fixedly mounted to a housing 35 of the transmission.

As shown in the gear-shifting diagram of FIG. 3, a driving operation takes place in gears or speeds 1-4 by clutch K3 to the small sun gear 13; whereas, the driving operation proceeds in the fifth high speed or overdrive gear by the clutch K4 to the double carrier 8. In the reverse gear or speed, another transmission change takes place by way of the clutch K1 to the large sun gear 10.

In first gear, a transmission reaction is produced by actuation of the brake B2 to fixedly brake sun gear 20 of the rearward planetary gear system 6 and by the double carrier 8, resting on the sun gear 20 through the freewheel element F in the forward planetary gear system 5. When the vehicle in which the change-speed transmission is coasting, it is possible to brake by bridging the freewheel element F by means of the change-speed clutch K2.

In second gear, the transmission reaction is produced in the forward planetary gear system 5 by actuation of the brake B1 to fixedly brake forward sun gear 10 and in the rearward planetary gear system 6, in turn, by the further brake sun gear 20 so that the double carrier 8 is driven in a driving direction of rotation.

In third gear, the forward sun gear is additionally driven through the change-speed clutch K1 by the input shaft 4 in FIG. 1 and/or by the quill shaft 28 in FIG. 2, so that both sun gears 10, 13 are coupled and thus the forward planetary gear system 5 is placed into direct transmission ratio with the sun gear 20 of the rearward planetary system 6 being furthermore fixedly braked by the brake B2.

In high speed or overdrive, the sun gear 10 of the forward planetary gear system 5 is fixedly braked by the brake B1 and the transmission reaction in the rearward planetary system 6 is produced by the sun gear 20 which is now driven in the forward direction of rotation by the double carrier 8 through the change-speed clutch K2. In the high speed or overdrive, the torque converter 30 is bridged by the clutch K4 for the gear change.

In reverse gear, the double carrier 8 of the forward planetary system 5 is non-rotatably secured by the change-speed brake B3 with respect to the transmission housing 35, and the sun gear 20 of the rearward planetary system 6 is non-rotatably secured at the double carrier 8 by means of the change-speed clutch K2.

While we have shown and described only two embodiments in accordance with the present invention, it is understood that the same is not limited thereto, but is susceptible of numerous changes and modifications as known to one having ordinary skill in the art, and we therefore do not wish to be limited to the details shown and described herein, but intend to cover all such modifications as are encompassed by the scope of the appended claims.

We claim:

1. A change-speed transmission which includes an input shaft adapted to be driven by a prime mover, an output shaft adapted to be coupled with wheels of a vehicle, a forward and rearward planetary gear system for drivingly connecting the input shaft to the output shaft, the forward planetary gear system including a double carrier means for mounting two planetary gear means, one of the planetary gear means being adapted to mesh only with a first sun gear of the forward planetary gear system, the other planetary gear means being adapted to mesh with a second sun gear of the forward planetary gear system and with a ring gear means, one of the sun gears is adapted to be driven by the input shaft and the other sun gear is adapted to be fixedly braked, a first torque transmitting connection means for drivingly connecting the carrier means with a first transmission member of the rearward planetary gear system, a second torque transmitting connection means for drivingly connecting the ring gear means with a second transmission member of the rearward planetary gear system, and a change-speed clutch means arranged in one of the torque transmitting means for producing a direct transmission of the rearward planetary gear system, characterized in that the change-speed clutch means is arranged in the first torque transmitting means, a gear shifting clutch means is operatively connected with the carrier means and the input shaft for enabling a driving of the carrier means by the input shaft, the second sun gear of the forward planetary gear system is arranged between the first sun gear and the output shaft, and in that a further gear shifting clutch means is operatively connected with the input shaft and the sun gear for enabling a driving of the second sun gear by the input shaft.

2. A change-speed transmission according to claim 1, characterized in that a further change-speed clutch means is provided for enabling a direct transmission of the forward planetary gear system, the further change-speed clutch means being operatively arranged between the input shaft and the first sun gear.

3. A change-speed transmission according to claim 2, characterized in that a hydrodynamic torque converter is provided which includes a pump impeller operatively connected with the input shaft and a turbine impeller, and in that the further change-speed clutch means and the other planetary gear means of the forward planetary gear system are operatively connected between the turbine impeller and an associated sun gear.

4. A change-speed transmission according to one of claims 1, 2, or 3, characterized in that the gear shifting means is operatively connected with the carrier means and the input shaft by an intermediate shaft means arranged between the input shaft and the output shaft.

5. A change-speed transmission according to claim 4, characterized in that the further gear shifting means is operatively connected to the second sun gear and the input shaft by a quill shaft means which is fixed for rotation with the second sun gear.

6. A change-speed transmission according to claim 4, characterized in that the first transmission member is a sun gear of the second planetary gear system, the second transmission member is a ring gear means of the second planetary gear system.

7. A change-speed transmission according to claim 6, characterized in that the first torque transmitting connection means includes an outer driving drum extending over the ring gear means of the forward and rearward planetary gear system.

8. A change-speed transmission according to claim 7, characterized in that an additional change-speed clutch means is arranged between the outer driving drum and the sun gear of the rearward planetary gear system for enabling a coupling of the outer driving drum and the sun gear of the rearward planetary gear system.

9. A change-speed transmission according to claim 8, characterized in that a change-speed brake means is operatively associated with the outer driving drum for braking the carrier means.

10. A change-speed transmission according to claim 9, characterized in that a further change-speed brake means is operatively connected with the sun gear of the rearward planetary gear system for enabling a braking thereof.

11. A change-speed transmission according to claim 10, characterized in that an inner driving drum is provided for connecting the ring gear means of the forward and rearward planetary gear systems.

* * * * *